US010749786B2

(12) United States Patent
Thubert et al.

(10) Patent No.: US 10,749,786 B2
(45) Date of Patent: Aug. 18, 2020

(54) PATH OPTIMIZATION BASED ON REDUCING DOMINATING SET MEMBERSHIP TO ESSENTIAL PARENT DEVICES

(71) Applicant: Cisco Technology, Inc., San Jose, CA (US)

(72) Inventors: Pascal Thubert, La Colle sur Loup (FR); Patrick Wetterwald, Mouans Sartoux (FR); Jean-Philippe Vasseur, Saint Martin d'Uriage (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 201 days.

(21) Appl. No.: 15/446,705

(22) Filed: Mar. 1, 2017

(65) Prior Publication Data

US 2018/0254971 A1    Sep. 6, 2018

(51) Int. Cl.
*H04L 12/751* (2013.01)
*H04L 12/717* (2013.01)
*H04L 12/947* (2013.01)

(52) U.S. Cl.
CPC .......... *H04L 45/02* (2013.01); *H04L 45/42* (2013.01); *H04L 49/251* (2013.01)

(58) Field of Classification Search
CPC ..... H04W 84/18; H04W 84/20; H04W 84/22; H04W 28/021; H04L 45/02; H04L 45/42; H04L 49/251
See application file for complete search history.

(56) References Cited

U.S. PATENT DOCUMENTS

| | | |
|---|---|---|
| 6,628,643 B1 | 9/2003 | Park et al. |
| 7,366,111 B2 | 4/2008 | Thubert et al. |
| 7,369,512 B1 | 5/2008 | Shurbanov et al. |
| 7,860,025 B2 | 12/2010 | Thubert et al. |
| 8,102,775 B2 | 1/2012 | Thubert |
| 9,344,256 B2 | 5/2016 | Thubert et al. |

(Continued)

OTHER PUBLICATIONS

RFC 6550 ; "RPL: IPv6 Routing Protocol for Low-Power and Lossy Networks"; Internet Engineering Task Force (IETF), pp. 1-157 (Year: 2012).*

(Continued)

*Primary Examiner* — Un C Cho
*Assistant Examiner* — Kenan Cehic
(74) *Attorney, Agent, or Firm* — Leon R. Turkevich

(57) ABSTRACT

In one embodiment, a method comprises identifying, by a path computation element, essential parent devices from a nonstoring destination oriented directed acyclic graph (DODAG) topology as dominating set members belonging to a dominating set; receiving, by the path computation element, an advertisement message specifying a first dominating set member having reachability to a second dominating set member, the reachability distinct from the nonstoring DODAG topology; and generating, by the path computation element based on the advertisement message, an optimized path for reaching a destination network device in the nonstoring DODAG topology via a selected sequence of dominating set members, the optimized path providing cut-through optimization across the nonstoring DODAG topology.

20 Claims, 8 Drawing Sheets

(56) References Cited

U.S. PATENT DOCUMENTS

| | | | |
|---|---|---|---|
| 9,479,421 B2 | 10/2016 | Thubert et al. | |
| 2003/0110291 A1* | 6/2003 | Chen | H04W 40/32 709/244 |
| 2007/0226239 A1* | 9/2007 | Johnson | H04L 43/022 |
| 2009/0147714 A1* | 6/2009 | Jain | H04W 52/0216 370/311 |
| 2009/0274157 A1* | 11/2009 | Vaidya | H04L 45/04 370/400 |
| 2011/0216656 A1 | 9/2011 | Pratt, Jr. et al. | |
| 2012/0213124 A1 | 8/2012 | Vasseur et al. | |
| 2012/0254338 A1* | 10/2012 | Agarwal | H04W 40/246 709/208 |
| 2012/0300668 A1 | 11/2012 | Thubert et al. | |
| 2012/0307652 A1* | 12/2012 | Vasseur | H04L 45/34 370/252 |
| 2013/0089002 A1 | 4/2013 | Young et al. | |
| 2013/0223218 A1* | 8/2013 | Vasseur | H04L 45/34 370/232 |
| 2013/0223237 A1* | 8/2013 | Hui | H04L 45/34 370/250 |
| 2013/0279365 A1* | 10/2013 | Hui | H04L 41/12 370/253 |
| 2014/0105015 A1* | 4/2014 | Hui | H04L 45/48 370/230.1 |
| 2014/0204759 A1* | 7/2014 | Guo | H04W 28/08 370/236 |
| 2015/0195192 A1* | 7/2015 | Vasseur | G06F 11/2007 714/47.3 |
| 2016/0197829 A1 | 7/2016 | Thubert et al. | |
| 2017/0048783 A1* | 2/2017 | Savolainen | H04W 76/10 |
| 2017/0264532 A1* | 9/2017 | Guo | H04L 45/16 |
| 2017/0273002 A1* | 9/2017 | Chen | H04W 40/04 |

OTHER PUBLICATIONS

Purohit et al., "Constructing Minimum Connected Dominating Set: Algorithmic approach", [online], International journal on applications of graph theory in wireless ad hoc networks and sensor networks (Graph-HOC) vol. 2, No. 3, Sep. 2010, [retrieved on Feb. 15, 2017]. Retrieved from the Internet: <URL: http://airccse.org/journal/graphhoc/papers/0910jgraph5.pdf>, pp. 59-66.

Thubert et al., "IETF 6TSCH: Combining IPv6 Connectivity with Industrial Performance", 2013 Seventh Conference on Innovative Mobile and Internet Services in Ubiquitous Computing, pp. 541-546.

Thubert et al., "An Architecture for IPv6 over the TSCH mode of IEEE 802.15.4e", [online] Jan. 27, 2015, [retrieved on Feb. 15, 2017]. 6Tisch, Internet Draft. Retrieved from the Internet: <URL: https://tools.ietf.org/pdf/draft-ietf-6tisch-architecture-05.pdf>, pp. 1-40.

Thubert, Ed., et al., "Root iniated routing state in RPL", [online], Dec. 7, 2016, [retrieved on Feb. 15, 2017]. ROLL, Internet Draft. Retrieved from the Internet: <URL: https://tools.ietf.org/pdf/draft-ietf-roll-dao-projection-00.pdf>, pp. 1-14.

Thubert et al., "An Architecture for IPv6 over Time Slotted Channel Hopping", [online], Apr. 19, 2013, [retrieved on May 24, 2013]. Retrieved from the Internet: <URL: http://tools.ietf.org/html/draft-thubert-6tsch-architecture>, 6TSCH, Internet Draft, pp. 1-12.

Watteyne et al., "Using IEEE802.15.4e TSCH in an LLN context: Overview, Problem Statement and Goals", [online], May 23, 2013, [retrieved on May 24, 2013]. Retrieved from the Internet: <URL: http://tools.ietf.org/html/draft-watteyne-6tsch-tsch-lln-context>, pp. 1-23.

LeClare et al., "How a standard is born: IEEE P1901.2 for narrowband OFDM PLC", [online], May 22, 2013, [Retrieved on Feb. 15, 2017]. Retrieved from the Internet: <URL: http://www.edn.com/Pdf/ViewPdf?contentItemId=4415005>, 10 pages.

Vasseur et al., "RPL: The IP routing protocol designed for low power and lossy networks", Internet Protocol for Smart Objects (IPSO) Alliance, [online], Apr. 2011, [retrieved on Sep. 6, 2013]. Retrieved from the Internet: <URL: http://www.cs.berkeley.edu/~jwhui/6lowpan/IPSO-WP-7.pdf>, 20 pages.

Singh et al., "A Survey on Cluster Based Routing Protocols in Wireless Sensor Networks", [online] Procedia Computer Science 45, International Conference on Advanced Computing Technologies and Appliances (ICACTA—2015), [retrieved on Feb. 15, 2017]. Retrieved from the Internet: <URL: http://ac.els-cdn.com/S1877050915003695/1-s2.0-S1877050915003695-main.pdf?_tid=e84ef464-f393-11e6-a4b3-00000aab0f26&acdnat=1487172906_e64de108ccc44a6075b305872b861981>, pp. 687-695.

Farrel et al., "A Path Computation Element (PCE)-Based Architecture", Network Working Group, Request for Comments: 4655, Aug. 2006, 40 pages.

Levis et al., "The Trickle Algorithm", Internet Engineering Task Force (IETF), Request for Comments: 6206, Mar. 2011, pp. 1-13.

Winter et al., "RPL: IPv6 Routing Protocol for Low-Power and Lossy Networks", Internet Engineering Task Force (IETF), Request for Comments: 6550, Mar. 2012, pp. 1-157.

Thubert, Ed., "Objective Function Zero for the Routing Protocol for Low-Power and Lossy Networks (RPL)", Internet Engineering Task Force (IETF), Request for Comments: 6552, Mar. 2012, 14 pages.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Thubert et al., U.S. Appl. No. 15/258,484, filed Sep. 7, 2016.
Wetterwald et al., U.S. Appl. No. 15/359,739, filed Nov. 23, 2016.
Wetterwald et al., U.S. Appl. No. 15/361,563, filed Nov. 28, 2016.

\* cited by examiner

US 10,749,786 B2

PATH OPTIMIZATION BASED ON REDUCING DOMINATING SET MEMBERSHIP TO ESSENTIAL PARENT DEVICES

TECHNICAL FIELD

The present disclosure generally relates to path optimization based on reducing dominating set membership to essential parent devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs) allow a large number (e.g., tens of thousands) of resource-constrained devices to be interconnected to form a wireless mesh network. The Internet Engineering Task Force (IETF) has proposed a routing protocol ("6TiSCH") that provides IPv6 routing using time slotted channel hopping (TSCH) based on IEEE 802.15.4e. Although a centralized entity such as a Path Computation Entity (PCE) can be used for route calculation between a small number of different network devices, the complexity in calculating a TSCH schedule by the PCE limits the number of network devices to less than one hundred (100) within the network, or more typically no more than about thirty (30) network devices, as the PCE is incapable of maintaining the peerings between a larger number of network devices. Hence, a PCE is incapable of calculating 6TiSCH routes between network devices in a data network containing a larger number of network devices.

U.S. Pat. No. 9,344,256 to Cisco Technology, Inc., describes a path computation element (PCE) device that can classify each member network device that belongs to a directed acyclic graph for a destination as a member of a dominating set, such that any network device in the network either is a member of the dominating set, or a "leaf network device" that is one and only one hop away from a member of the dominating set.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
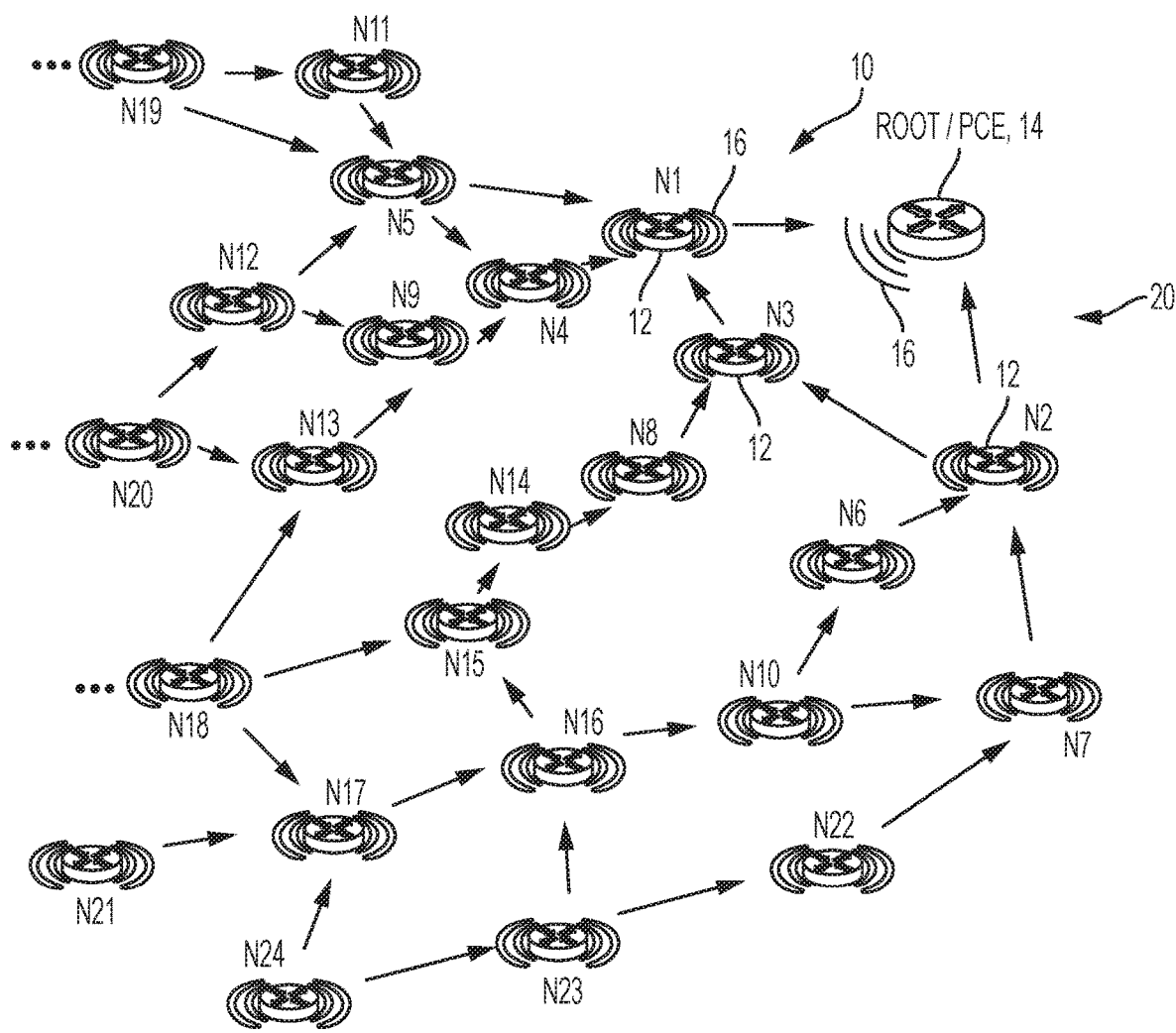
FIGS. 1A-1D illustrate an example system having an apparatus for identifying dominating set members belonging to a dominating set based on identifying essential parent devices from a nonstoring destination oriented directed acyclic graph (DODAG), and generating an optimized path providing cut-through optimization across the nonstoring DODAG topology for reaching a destination network device via a selected sequence of dominating set members, according to an example embodiment.

In one embodiment, a method comprises identifying, by a path computation element, essential parent devices from a nonstoring destination oriented directed acyclic graph (DODAG) topology as dominating set members belonging to a dominating set; receiving, by the path computation element, an advertisement message specifying a first dominating set member having reachability to a second dominating set member, the reachability distinct from the nonstoring DODAG topology; and generating, by the path computation element based on the advertisement message, an optimized path for reaching a destination network device in the nonstoring DODAG topology via a selected sequence of dominating set members, the optimized path providing cut-through optimization across the nonstoring DODAG topology.

In another embodiment, an apparatus comprises a processor circuit and a device interface circuit. The processor circuit is configured for identifying essential parent devices from a nonstoring destination oriented directed acyclic graph (DODAG) topology as dominating set members belonging to a dominating set. The device interface circuit is configured for receiving an advertisement message specifying a first dominating set member having reachability to a second dominating set member, the reachability distinct from the nonstoring DODAG topology. The processor circuit further is configured for generating, based on the advertisement message, an optimized path for reaching a destination network device in the nonstoring DODAG topology via a selected sequence of dominating set members. The optimized path provides cut-through optimization across the nonstoring DODAG topology.

In another embodiment, one or more non-transitory tangible media are encoded with logic for execution by a machine and when executed by the machine operable for: identifying, by the machine implemented as a path computation element, essential parent devices from a nonstoring destination oriented directed acyclic graph (DODAG) topology as dominating set members belonging to a dominating set; receiving, by the path computation element, an advertisement message specifying a first dominating set member having reachability to a second dominating set member, the reachability distinct from the nonstoring DODAG topology; and generating, by the path computation element based on the advertisement message, an optimized path for reaching a destination network device in the nonstoring DODAG topology via a selected sequence of dominating set members, the optimized path providing cut-through optimization across the nonstoring DODAG topology.

In another embodiment, a method comprises: receiving, by a network device in a nonstoring destination oriented directed acyclic graph (DODAG) topology, a membership message from a root of the nonstoring DODAG topology, the membership message identifying the network device as a dominating set member belonging to a dominating set; advertising, by the network device to the root, reachability by the network device to one or more other dominating set members; and receiving, by the network device, path information for reaching a destination network device in the nonstoring DODAG topology, the path information enabling the network device to forward a data packet toward the destination network device along an optimized path of a sequence of dominating set members, the optimized path providing cut-through optimization across the nonstoring DODAG topology.

In another embodiment, an apparatus comprises a device interface circuit and a processor circuit. The device interface circuit is configured for receiving, in a nonstoring destination oriented directed acyclic graph (DODAG) topology, a membership message from a root of the nonstoring DODAG topology, the membership message identifying the apparatus as a dominating set member belonging to a dominating set. The processor circuit is configured for generating an advertisement for transmission by the device interface circuit to the root, the advertisement advertising reachability by apparatus to one or more other dominating set members. The device interface circuit further is configured for receiving path information for reaching a destination network device in the nonstoring DODAG topology, the path information enabling the processor circuit to cause forwarding of a data packet toward the destination network device along an optimized path of a sequence of dominating set members, the optimized path providing cut-through optimization across the nonstoring DODAG topology.

In another embodiment, one or more non-transitory tangible media encoded with logic for execution by a machine and when executed by the machine operable for: receiving, by the machine implemented as a network device in a nonstoring destination oriented directed acyclic graph (DODAG) topology, a membership message from a root of the nonstoring DODAG topology, the membership message identifying the network device as a dominating set member belonging to a dominating set; advertising, by the network device to the root, reachability by the network device to one or more other dominating set members; and receiving, by the network device, path information for reaching a destination network device in the nonstoring DODAG topology, the path information enabling the network device to forward a data packet toward the destination network device along an optimized path of a sequence of dominating set members, the optimized path providing cut-through optimization across the nonstoring DODAG topology.

DETAILED DESCRIPTION

Particular embodiments enable a management entity, for example a path computation element (PCE), to reduce the members of a dominating set (DS) necessary for establishing a path to a destination network device within a wireless sensor network, while enabling the path computation element to establish optimized paths that provide cut-through optimization using a selected sequence of dominating set members. The particular embodiments enable a PCE to improve its computational efficiency and generate one or more paths to reach a destination network device despite the reduction in dominating set membership.

FIGS. 1A-1D are diagrams illustrating an example wireless sensor data network 10 having network devices 12 (e.g., "N1" through "N24"), and including a root network device 14 operating as a path computation element (PCE) configured for generating an optimized path (illustrated as a dashed line 18 of FIG. 1D) via dominating set members based on the PCE reducing dominating set membership to essential parent devices, according to an example embodiment. Although the example embodiments illustrate the PCE implemented within the root network device 14, the PCE also can be implemented in a machine that is distinct from the root network device 14, where the root network device and the machine executing the PCE can establish communications via one or more wired or wireless data network connections between the root network device and the machine executing the PCE (e.g., via a local area network, a backbone network between LLN border routers, and/or a wide area network).

The data network 10 is established based on the network devices 12 and 14 establishing a physical link layer mesh network via wireless data links 16, and the root/PCE device 14 establishing one or more network routing topologies 20 overlying the mesh network. The root/PCE device 14 can establish one or more network routing topologies 20, overlying the mesh network, for example based on executing a routing protocol for low power and lossy networks (RPL) according to the Internet Engineering Task Force (IETF) Request for Comments (RFC) 6550: the root/PCE device 14 can establish the network topology (e.g., a "RPL instance") 20 in the form of a directed acyclic graph (DAG) toward the single "root" network device 14, also referred to as a "DAG root" or a "DAG destination"; hence, the DAG also is referred to as a Destination Oriented DAG (DODAG) 20 (the root network device 14 of the DODAG topology 20 also can be implemented as an LLN border router). Network traffic in the nonstoring DODAG topology 20 can move either "up" towards the DODAG root 14, or "down" towards DODAG leaf nodes (e.g., "N18", "N19", "N20", "N21", "N24") via source-route headers in the data packets transmitted in the "downward" direction away from the DODAG root 14.

Although only the network devices "N1", "N2", and "N3" are labeled with the reference numeral "12" in FIGS. 1A-1D to avoid cluttering in the Figures, it should be apparent that all the network devices "N1" through "N24" are allocated the reference numeral "12" for purposes of the description herein. Further, it should be apparent that all the network devices "N1" through "N24" 12 are configured for establishing wireless data links 16 (illustrated as curved lines radiating from each device 12 or 14), even though only the wireless data links for the network device "N1" 12 and root network device 14 are labeled with the reference numeral "16" to avoid cluttering in the Figures.

A particular concern is the relative ability of the PCE device to establish paths for reaching the network devices 12 in a scalable manner. In particular, each RPL node in an LLN typically is constrained by processing power, memory, and energy (e.g., battery power); interconnecting links between the RPL nodes typically are constrained by high loss rates, low data rates, and instability with relatively low packet delivery rates. The PCE often is required to establish numerous paths for different devices in the data network 10; however, the presence of numerous resource-constrained network devices 12 (e.g., on the order of tens of thousands) requires the root/PCE device 14 to perform all path calculations, including for example time-based scheduling if the data network 10 is to include time slotted channel hopping as in 6TiSCH in order to establish a deterministic network (i.e., a data network that can guarantee delivery of data packets to an identified network device at an identified time instance).

Hence, the presence of numerous optimization constraints (e.g., latency, throughput, minimized error rate, etc.), in combination with a substantially large number of network devices in a data network, can result in an NP-complete problem (nondeterministic polynomial time) for the root/PCE device 14 that can cause an exponential increase in the computational cost of finding an acceptable solution for an increasing number of constrained paths as the number of network devices 12 increases. Hence, the computation requirements for a root/PCE device 14 can increase dramatically as the number of network devices increase. The PCE can reduce its computational load by reducing its path calculations to members of a dominating set, where the PCE can identify members of the dominating set based on their relative position in the nonstoring DODAG topology 20.

A "Dominating Set" is an identifiable set of connected network devices in a network, where any network device in the network either is a member of the dominating set, or a non-dominating set member that is one and only one hop away from a member of the dominating set (i.e., "dominating set member") via a wireless (or wired) data link 16. The term "non-dominating set member" as used in herein (and in the claims) is defined as a network device that: (1) is attached to a dominating set member; and (2) that does have any dominating set member attached to it.

A PCE can reduce computational complexity by limiting path computation to members of the dominating set, eliminating the necessity of calculating optimized paths for leaf nodes that do not belong to the dominating set. Although the size of a dominating set can be reduced by excluding from membership any leaf network device that does not have any attached child network device (e.g., "N19", "N20", "N21" and "N24" of FIG. 1A), an additional concern is the PCE relying on the nonstoring DODAG topology 20 to establish a path for sending a data packet from a source network device (e.g., "N19") 12 to a destination network device (e.g., "N24") 12 via the nonstoring DODAG topology 20. As illustrated in FIG. 1A, even if the leaf network devices "N18", "N19", "N20", "N21" and "N24" are removed from membership in a dominating set (DS) by the root/PCE device 14, resulting in a hypothetical dominating set consisting of the root network device 14 and the network devices "N1" through "N17", "N22", and "N23", the hypothetical dominating set still would result in a relatively dense number of dominating set members near the root/PCE device 14, and a relatively sparse number of dominating set members near the leaf network devices "N18", "N19", "N20", "N21" and "N24". Consequently, any path from the source network device (e.g., "N19") 12 to the destination network device (e.g., "N24") 20 via the nonstoring DODAG topology 20 necessarily requires traversal via a common parent device (e.g., "N1") 12 in the nonstoring DODAG topology 20, resulting in the 9-hop path "N19->N5->N1->N3->N8->N14->N15->N16->N17->N24".

Figure 1B:
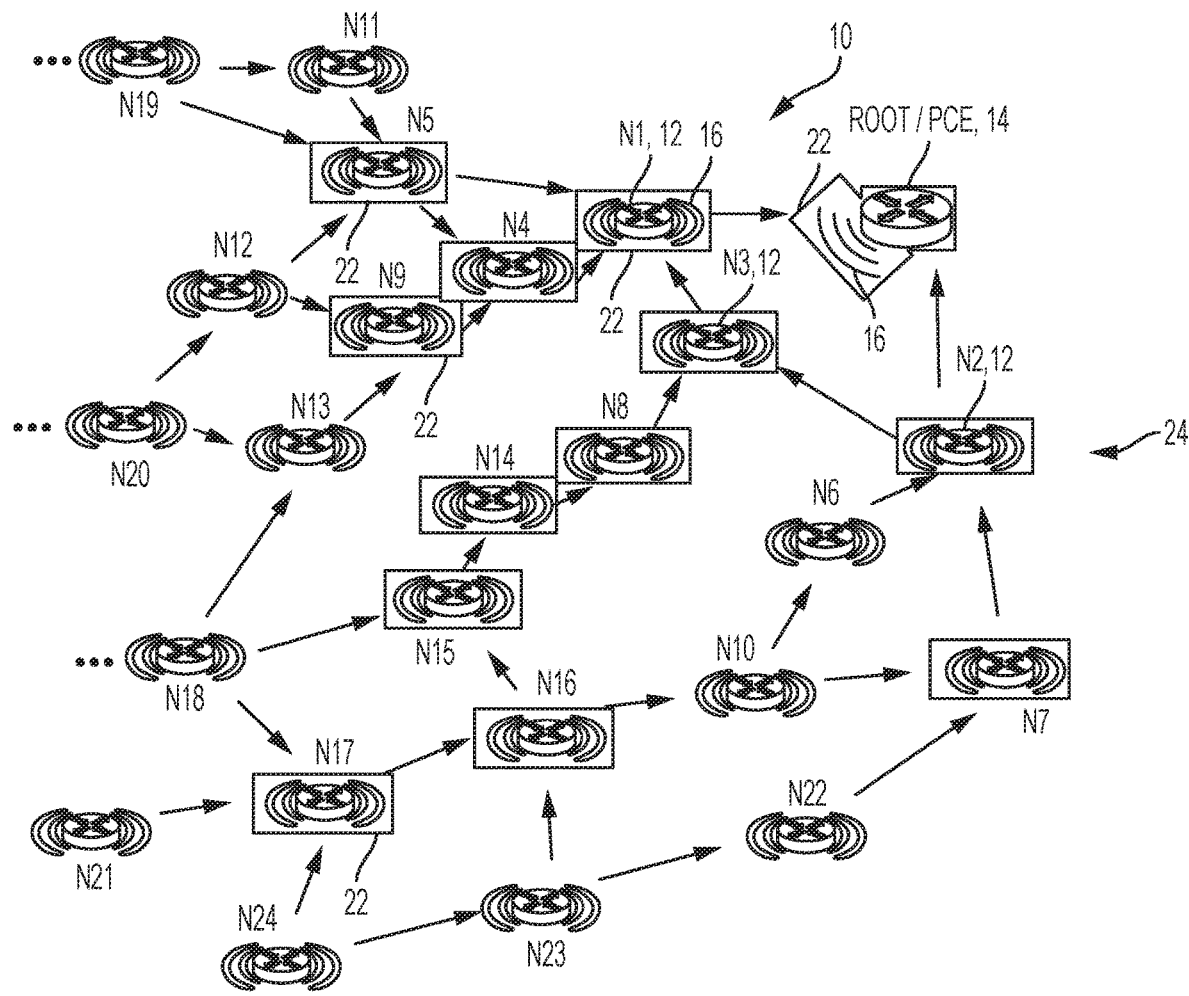
Figure 1C:
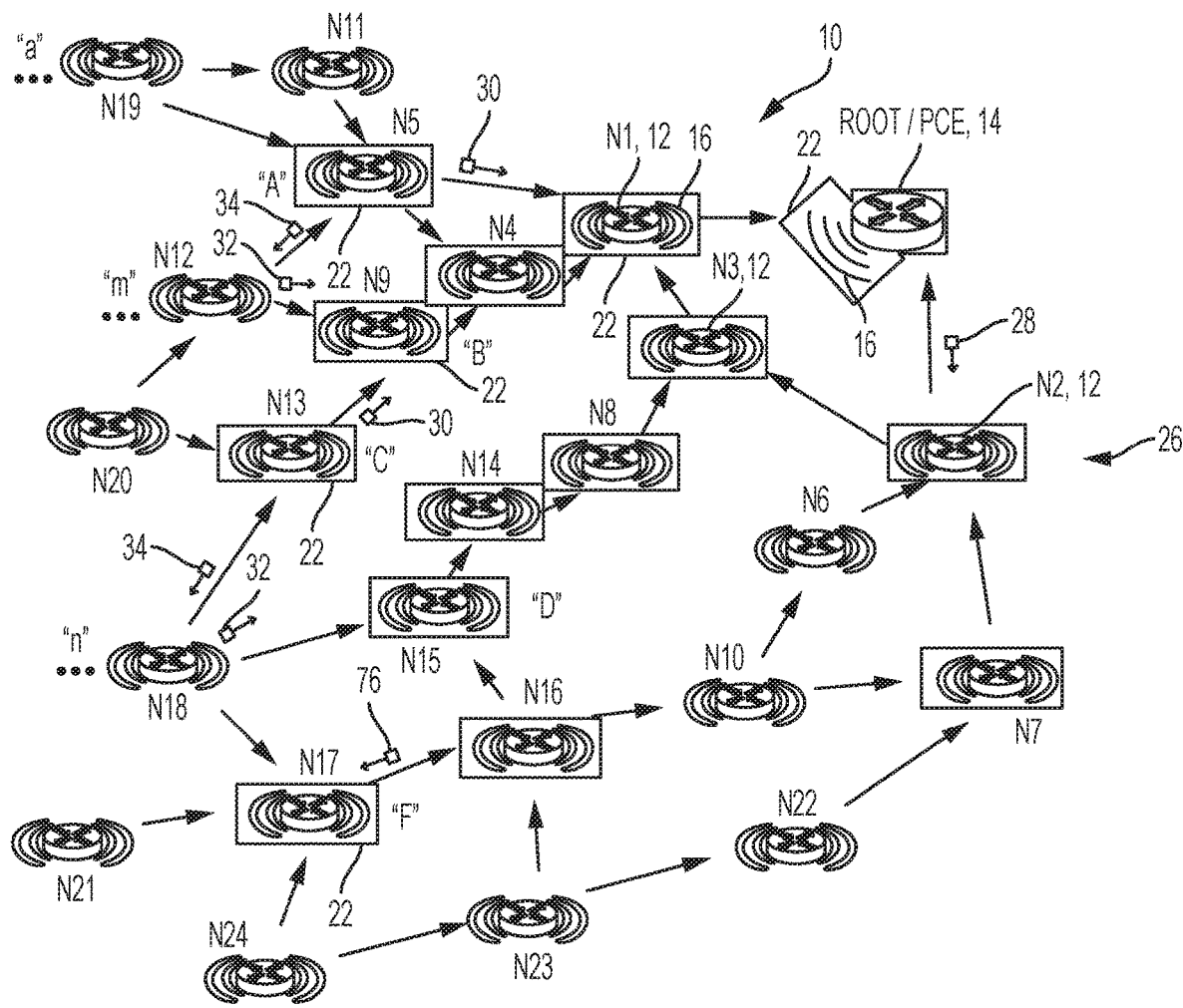
Figure 1D:
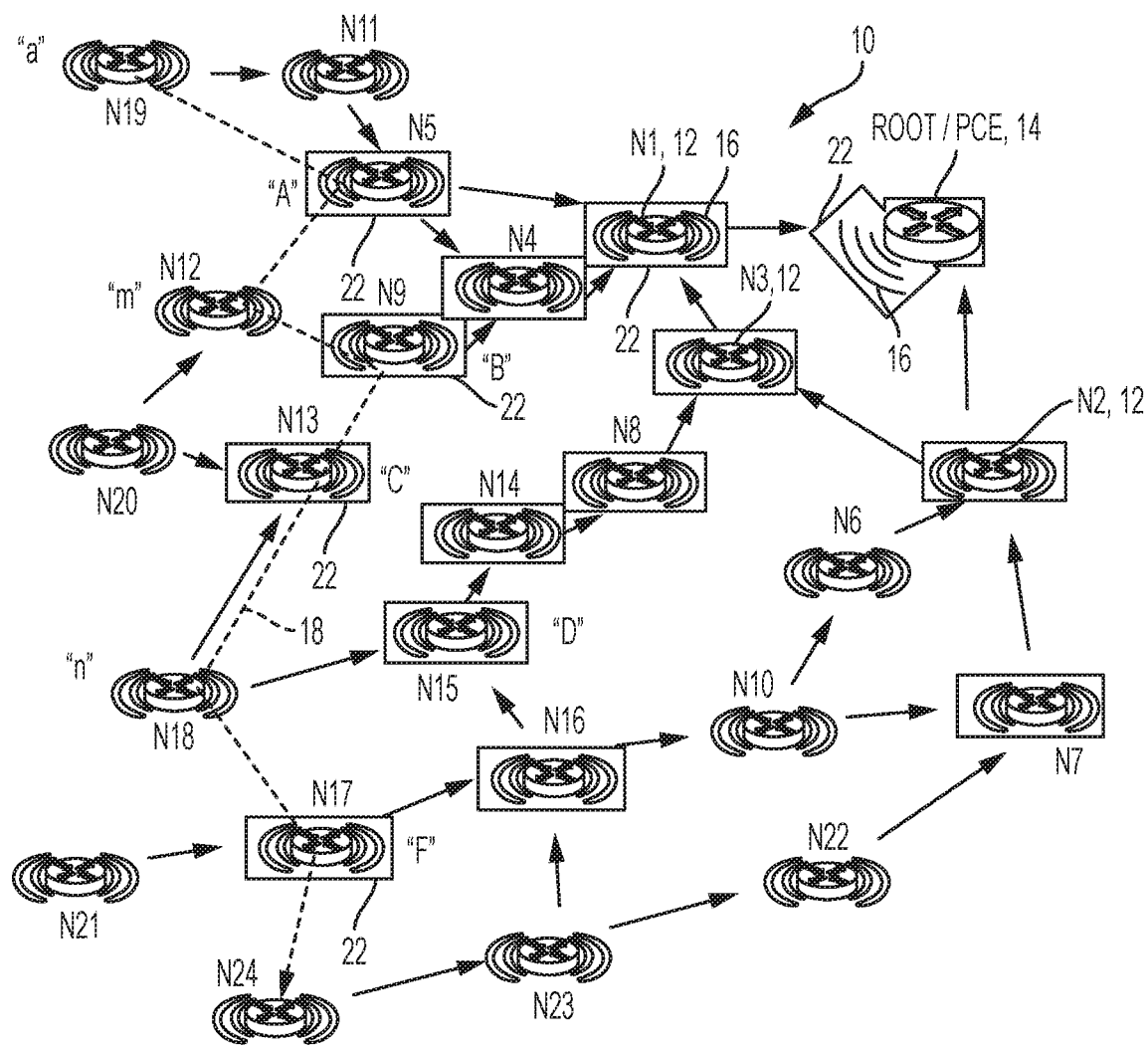

According to an example embodiment, the root/PCE device 14 can identify essential parent devices from a nonstoring DODAG topology 20 as dominating set members 22 belonging to a dominating set: the dominating set members 22 selected by the root/PCE device 14 are illustrated in FIGS. 1B-1D by the "box" 22 around the root/PCE device 14, and the "box" 22 around the network devices "N1" through "N5", "N7" through "N9", and "N13" through "N17". Although only the "box" for the root/PCE device 14 and the respective "boxes" for the network devices "N1", "N5", "N9", and "N17" are labeled with the reference numeral "22" in FIGS. 1B-1D (and for network device "N13" in FIGS. 1C-1D) to avoid cluttering in the Figures, it should be apparent that the respective boxes for all the network devices "N1" through "N5", "N7" through "N9", and "N13" through "N17" are allocated the reference numeral "20" to identify these nodes as dominating set members, for purposes of the description herein.

As illustrated in FIG. 1B, the root/PCE device 14 can identify the dominating set members 22 of an initial dominating set 24 based on excluding not only the leaf nodes "N18", "N19", "N20", "N21", and "N24" 12, but also any redundant parent devices in the nonstoring DODAG topology 20, such as the redundant parent devices "N6", "N10", "N11", "N12", "N13", "N22", and "N23" 12; hence, as illustrated in FIG. 1B the root/PCE device 14 can identify a first group of essential parent devices (also referred to as "first essential parent devices") that provide the only path for another network device to reach the root 14 of the nonstoring DODAG topology 20, the first essential parent devices illustrated in FIG. 1B as the network devices "N1" through "N5", "N7" through "N9", and "N14" through "N17". Hence, the root/PCE device 14 can classify the first essential parent devices "N1" through "N5", "N7" through "N9", and "N14" through "N17" as dominating set members 22 belonging to the initial dominating set 24.

As illustrated in FIG. 1C, the root/PCE device 14 also can selectively add one of the redundant parent devices (e.g., "N13") as belonging to the final dominating set 26, based on the one redundant parent device (e.g., "N13") providing a necessary path for an identified orphan network device (e.g., "N20") to reach at least one of the first essential parent devices (e.g., "N9"), resulting in the dominating set members "N1" through "N5", "N7" through "N9", and "N13" through "N17" 22 of FIG. 1C that belong to the final dominating set 26.

Hence, the example embodiments enable the root/PCE device 14 to substantially reduce the number of dominating set members; as illustrated in FIG. 1C, the removal of redundant parent devices that results in the dominating set including only the root network device and essential parent devices (including any parent providing a necessary path for an identified orphan network device), enables a reduction of an additional six (6) network devices (e.g., N6, N10, N11-N12, N22-N23) from the final dominating set 26, relative to the above-described hypothetical dominating set. The root/PCE device 14 can unicast transmit a membership message (28 of FIG. 1C) to each dominating set member 22, indicating membership in the final dominating set 26.

As described in further detail below, the example embodiments also enable a dominating set member 22 to transmit to the root/PCE device 14 a unicast reachability advertisement message 30 that specifies reachability by the corresponding dominating set member (e.g., "N13") to one or more other dominating set members (e.g., "N15" and/or "N17"), where the reachability is distinct from the nonstoring DODAG topology 20: in response to the root/PCE device 14 receiving one or more of the unicast reachability advertisement messages 30 specifying a first dominating set member having reachability to a second dominating set member, the root/PCE device 14 can generate an optimized path (18 of FIG. 1D) for reaching a destination network device (e.g., "N24") 12 in the nonstoring DODAG topology 20 via a selected sequence of dominating set members (e.g., "N5-N9-N13-N17"), where the optimized path 18 provides cut-through optimization across the nonstoring DODAG topology 20 based on the reachability between dominating set members 22 (as specified in the unicast reachability advertisement messages 30). As described in further detail below, the dominating set members 22 can detect reachability between other dominating set members 22 based on receiving multicast advertisement messages (32 of FIG. 1C) from other network devices 12, for example from other dominating set members 22 or from non-dominating set devices (e.g., "N12", "N18") advertising reachability to one or more dominating set members 22: the root/PCE device 14 can send a non-membership message 34 to each non-dominating set device (e.g., "N6", "N10", "N11", "N12", "N18" through "N24"), which can cause the non-dominating set device to multicast advertise a corresponding multicast advertisement message 32 advertising its ability to reach one or more dominating set members 22. Hence, one or more dominating set members (e.g., "N13") 22 can respond to a multicast advertisement message 32 (e.g., from the non-dominating set device "N18") to identify reachability to other dominating set members (e.g., "N15", "N17") via a path that is distinct from the nonstoring DODAG topology 20, e.g., via the network device "N18" that is not a common parent to any of the dominating set members "N13", "N15", or "N17" 22.

Hence, the cut-through optimization of the optimized path 18 across the nonstoring DODAG topology 20 is based on reachability between one or more of the selected sequence of dominating set members (e.g., "N5-N9-N13-N17") that is distinct from the nonstoring DODAG topology 20, for example the indirect reachability provided by non-dominating set members (e.g., "N12" and "N18") that can operate as relay devices between two dominating set members 22, as opposed to reliance on a common parent device (e.g., "N1") in the nonstoring DODAG topology 20.

Figure 2:
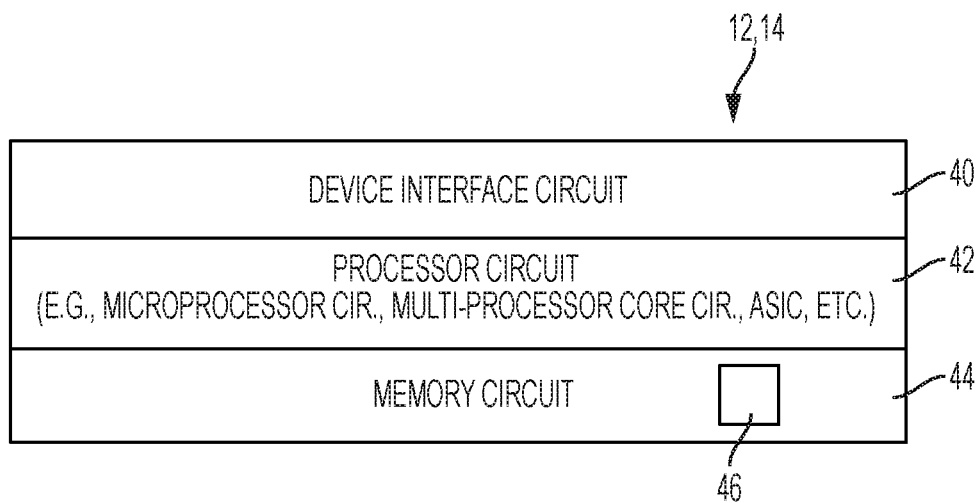
FIG. 2 illustrates an example implementation of any one of the devices of FIG. 1, according to an example embodiment.

FIG. 2 illustrates an example implementation of any one of the devices 12 and/or 14 of FIGS. 1A-1D, according to an example embodiment.

Each apparatus 12 and/or 14 is implemented as a machine and can include a device interface circuit 40, a processor circuit 42, and a memory circuit 44. The device interface circuit 40 can include one or more distinct physical layer transceivers for communication with any one of the other devices 12 and/or 14; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein, for example in a data structure 46.

Any of the disclosed circuits of the devices 12 and/or 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
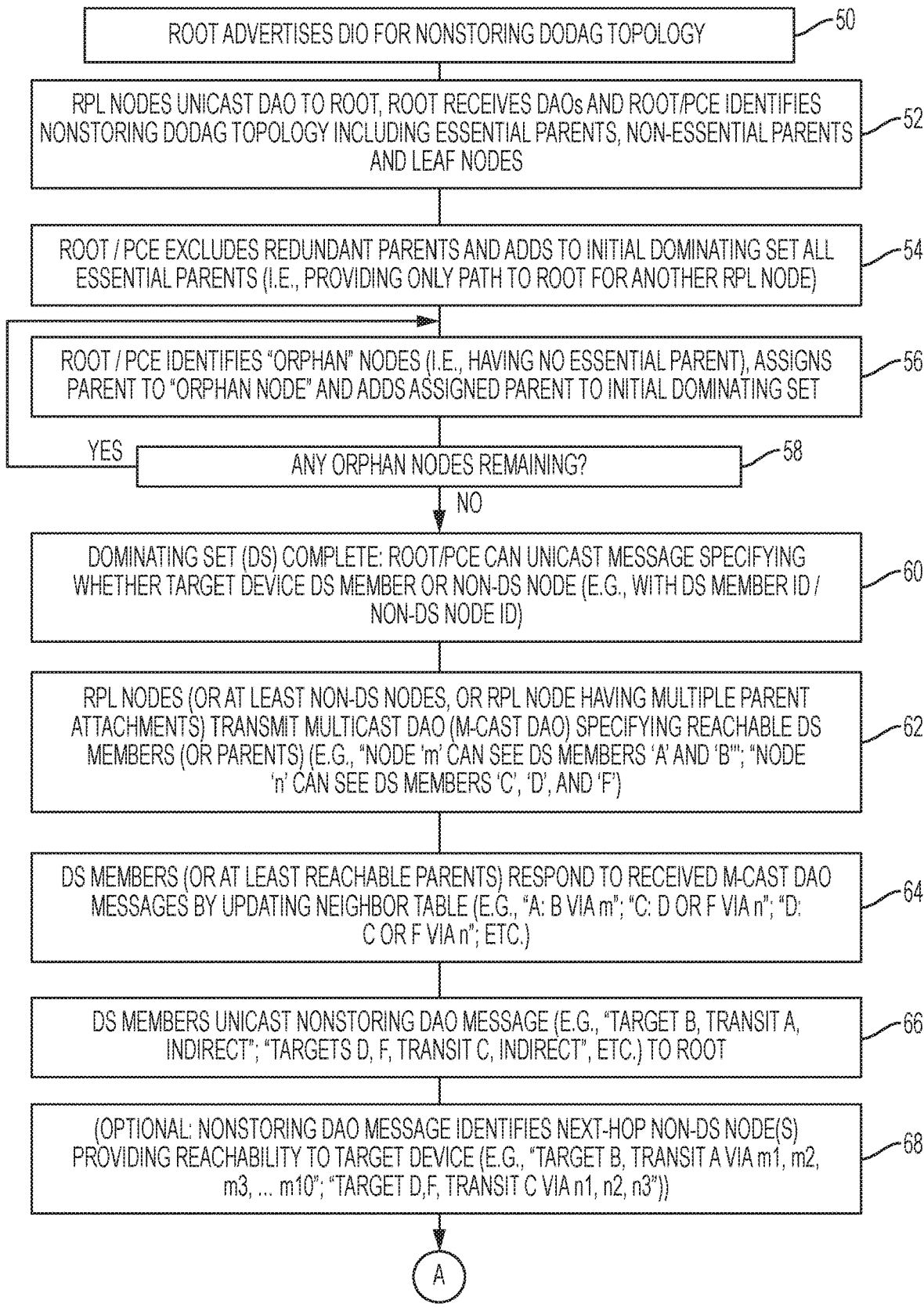
FIGS. 3A-3B illustrate an example method of the apparatus of FIG. 1 optimizing a path providing cut-through optimization across a nonstoring DODAG topology, based on reducing the dominating set membership to essential parent devices, and generating the optimized path via a selected sequence of dominating set members, according to an example embodiment.
Figure 3B:
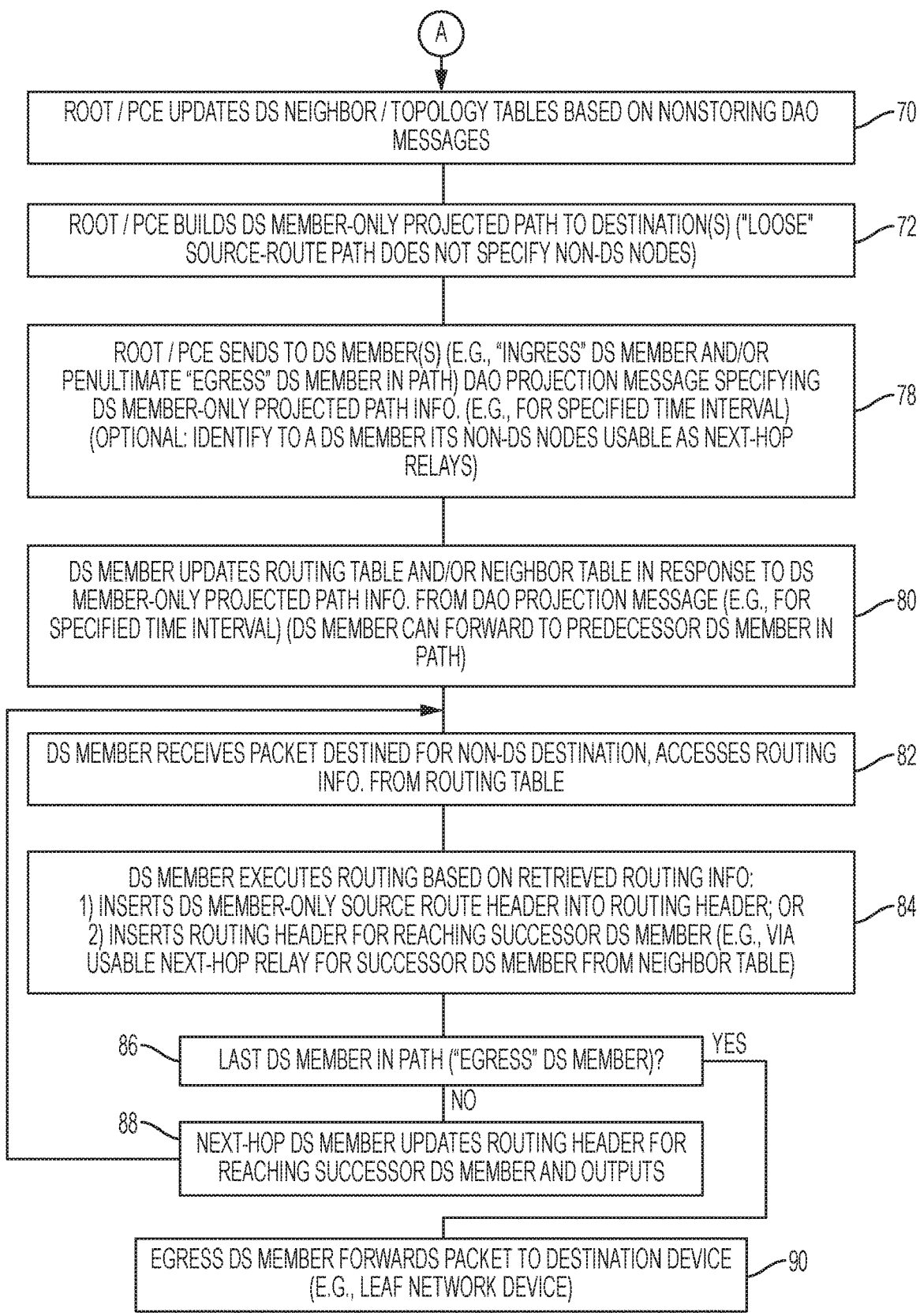

FIGS. 3A-3B illustrate an example method of the apparatus of FIG. 1 optimizing a path providing cut-through optimization across a nonstoring DODAG topology, based on reducing the dominating set membership to essential parent devices, and generating the optimized path via a selected sequence of dominating set members, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the network devices 12 in operation 50 can form a nonstoring DODAG topology 20 in response to the device interface circuit 40 of the root/PCE device 14 outputting in operation 50 a DODAG information object (DIO) as the DAG root: a "child" network device 12 detecting the DIO can select the DAG root 14 as a parent in the identified nonstoring DODAG topology 20 based on comparing network topology metrics (advertised in the DIO) to a prescribed objective function specified in the DIO for the RPL instance. The "child" network device, upon attaching to its parent, can output its own DIO with updated network topology metrics that enable other network devices 12 to discover the nonstoring DODAG topology 20, learn the updated network topology metrics, and select a DODAG parent based on the objective function specified in the DIO for attachment to the nonstoring DODAG topology 20. Hence, propagation of updated DIO messages, for example according to RFC 6550, can result in the nonstoring DODAG topology 20 illustrated in FIG. 1A. The nonstoring DODAG topology 20 results in the network devices 12 not storing any routing information, except for identifying parent network devices as next-hop parents in order to establish a default route for reaching the root/PCE device 14; the non-storing mode enables memory savings in intermediate nodes in between the root/PCE device 14 and "leaf" network devices (e.g., "N18", "N19", "N20", and "N21") in the nonstoring DODAG topology 20, and is particularly suited to P2MP and MP2P traffic.

Each of the network devices 12 (also referred to as "RPL nodes") in the nonstoring DODAG topology 20 of FIG. 1A can generate and unicast output to the root/PCE device 14 in operation 52 a Destination Advertisement Object (DAO) message: in response to the device interface circuit 40 of the root/PCE device 14 receiving in operation 52 the DAO messages from each of the network devices 12 of the nonstoring DODAG topology 20, the processor circuit 42 of the root/PCE device 14 in operation 52 can identify the nonstoring DODAG topology 20, including an identification of essential parents, non-essential parents, and leaf nodes.

In particular, the processor circuit 42 of the root/PCE device 14 in operation 54 can identify essential parent devices as part of an initial dominating set 24 in FIG. 1B based on excluding redundant parents in the nonstoring DODAG topology 20: as illustrated in FIG. 1B, the processor circuit 42 of the root/PCE device 14 can reduce dominating set membership based on excluding the redundant parent devices "N6", "N10", "N11", "N12", "N13", "N22", and "N23" 12 from consideration for membership in the initial dominating set 24; as described previously, any leaf network device (e.g., "N18", "N19", "N20", "N21" and "N24" of FIG. 1A) that does not have any attached child network device also is excluded from consideration for membership in the initial dominating set 24.

Hence, the processor circuit 42 of the root/PCE device 14 in operation 54 identifies the first essential parent devices in the initial dominating set 24 that provide the only path for another network device to reach the root 14 of the nonstoring DODAG topology 20: as illustrated in FIG. 1B, the first essential parent devices "N1" through "N5", "N7" through "N9", and "N14" through "N17" provide a strict tree topology, where each first essential parent device has one and only one path for reaching the root/PCE device 14. Hence, the processor circuit 42 of the root/PCE device 14 can classify the first essential parent devices "N1" through "N5", "N7" through "N9", and "N14" through "N17" as dominating set members 22 belonging to the initial dominating set 24, and can store the initial dominating set 24 within a data structure 46 of the memory circuit 44 in the root/PCE device 14. The processor circuit 42 of the root/PCE device 14 also can store the list of leaf network devices (e.g., "N18", "N19", "N20", "N21" and "N24" of FIG. 1A) in the data structure 46.

The processor circuit 42 of the root/PCE device 14 in operation 56 can identify, from among the excluded network devices (e.g., "N6", "N10" through "N13" and "N18" through "N24") that the network device "N20" is an "orphan" network device that does is not attached to any parent device within the initial dominating set 24. In particular, the processor circuit 42 of the root/PCE device 14 in operation 56 identifies the network device "N20" as an "orphan" network device because none of its parent network devices "N12" or "N13" in FIG. 1B are members 22 of the initial dominating set 24, rather the network devices "N12" and "N13" in operation 54 were deemed to be redundant parent devices in the nonstoring DODAG topology 20; hence, the processor circuit 42 of the root/PCE device 14 in operation 56 is configured for selectively adding one of the redundant parent devices (e.g., "N13") 12 as belonging to the final dominating set 26 of FIG. 1C, based on the one redundant parent device (e.g., "N13") providing a necessary path for the identified orphan network device ("N20") to reach at least one of the first essential parent devices (e.g., "N9").

In response to the processor circuit 42 of the root/PCE device 14 determining in operation 58 that there are no more remaining orphan nodes, the processor circuit 42 of the root/PCE device 14 determines in operation 60 that the identification of the dominating set members 22 for the final dominating set 26 is complete, resulting in the processor circuit 42 storing in the data structure 46 the final dominating set 26. As illustrated in FIG. 1C, the final dominating set 26 consists of the essential parent devices "N1" through "N5", "N7" through "N9", and "N13" through "N17" 22. The processor circuit 42 of the root/PCE device 14 also can store in the data structure 46 the list of non-dominating set members, namely the network devices "N6", "N10" through "N12", and "N18" through "N24".

In response to determining the final dominating set 26, the processor circuit 42 of the root/PCE device 14 in operation 60 can generate, for unicast transmission by the device interface circuit 40 to each network device 12 in the nonstoring DODAG topology 20, either a corresponding membership message 28 or a corresponding non-membership message 34. The device interface circuit 40 of the root/PCE device 14 can unicast output to each dominating set member 22 (e.g., using a corresponding source-route header) a corresponding membership message 28 specifying that the corresponding network device is a member of the final dominating set 26; the membership message 28 optionally also can specify, for each dominating set member (e.g., "N5") 22, a corresponding dominating set member identifier (e.g., "A"). For example, the network device "N5" 12 can receive from its membership message 28 the corresponding membership identifier "A", the network device "N9" can receive from its membership message 28 the corresponding membership identifier "B", the network device "N13" can receive from its membership message 28 the corresponding membership identifier "C", the network device "N15" can receive from its membership message 28 the corresponding membership identifier "D", and the network device "N17" can receive from its corresponding membership message 28 the corresponding membership identifier "F". Other example membership identifiers can be used for each of the dominating set members 22.

The device interface circuit 40 of the root/PCE device 14 in operation 60 can unicast output to each non-dominating set member (e.g., any one of the network devices "N6", "N10" through "N12", and "N18" through "N24") a corresponding non-membership message 34 (illustrated in FIG. 1C with respect to network devices "N12" and "N18") indicating that the corresponding network device is not a member of the final dominating set 26. The non-membership message 34 generated by the root/PCE device 14 can be unicast output to the target network device, e.g., using a corresponding source-route header. The non-membership message 34 optionally also can specify, for each non-dominating set member, a corresponding non-dominating set member identifier, for example "a" for network device "N19", "m" for network device "N12", and "n" for network device "N18". As described in further detail below, multiple network devices attached to the same dominating set member(s) 22 can be allocated by the root/PCE device 14 a corresponding non-dominating set member identifier based on its corresponding position within the topology; for example, network devices attached to both the dominating set members "N5" and "N9" (similar to "N12") can be identified by the series of respective non-dominating set member identifiers "m1, m2, m3, etc.", and network devices attached to the network devices "N13", "N15", and "N17" can be identified by the series of respective non-dominating set member identifiers "n1, n2, n3, etc."

In response to receiving the membership message 28, a dominating set member (e.g., "N13") 22 can multicast a dominating set member advertisement message specifying its membership in the final dominating set 26 (e.g., by its corresponding membership identifier), enabling neighboring network devices (e.g., "N18", and/or "N20") to detect the membership of the corresponding dominating set member (e.g., "N13-C"). The dominating set member advertisement message can be part of, or distinct from, a multicast advertisement message 32 generated and transmitted by the dominating set member.

Each network device 12 in operation 62 can respond to the multicasting of each dominating set member advertisement message (and/or multicast advertisement message) by storing in its neighbor table in its data structure 46 that the corresponding dominating set member 22 is directly reachable. In one example, if a neighboring dominating set member (e.g., "N14") 22 can detect a dominating set member advertisement message from another dominating set member (e.g., "N9-B"), the neighboring dominating set member (e.g., "N14") 22 can store in its corresponding neighbor table in its data structure 46 that the dominating set member (e.g., "N9-B") is directly reachable via a data link that is distinct from the nonstoring DODAG topology 20 illustrated in FIG. 1A.

In response to the non-dominating set member "N12-m" detecting dominating set member advertisement messages from the respective dominating set members "N5-A" and "N9-B" 22, the non-dominating set member "N12-m" in the nonstoring DODAG topology 20 in operation 62 can transmit a corresponding multicast advertisement message 32 specifying that the non-dominating set member "m" can reach the dominating set members "A" and "B"; similarly, in response to the non-dominating set member "N18-n" detecting dominating set member advertisement messages from the respective dominating set members "N13-C", "N15-D", and "N17-F" 22, the non-dominating set member "N18-n" in the nonstoring DODAG topology 20 in operation 62 can transmit a corresponding multicast advertisement message 32 specifying that the non-dominating set member "n" can reach the dominating set members "C", "D", and "F". The multicast advertisement message 32 can be implemented based on the multicast DAO message described in Section 9.10 of RFC 6550 and modified as described herein to identify dominating set members that are reachable by a network device 12.

In response to the device interface circuit 40 of a dominating set member 22 detecting a multicast advertisement message 32 (e.g., from a non-dominating set member), the processor circuit 42 of the dominating set member 22 in operation 64 can in update its neighbor table (stored in the data structure 46) that the non-dominating set member can reach one or more other dominating set members 22. For example, the processor circuit 42 of the dominating set member "N5-A" 22 can respond to the multicast advertisement message 32 from the non-dominating set member "N12-m" by updating its neighbor table to specify that the dominating set member "B" 22 is reachable via the non-dominating set member "m"; similarly, the processor circuit 42 of the dominating set member "N13-C" 22 can respond to the multicast advertisement message 32 from the non-dominating set member "N8-n" by updating its neighbor table to specify that the dominating set member "D" 22 and the dominating set member "F" each are reachable via the non-dominating set member "n". As described previously, numerous neighbor table entries may be added for multiple non-dominating set members (e.g., "m1" through "m10", "n1" through "n10", etc.).

Hence, in response to the device interface circuit 40 of a dominating set member 22 detecting any multicast advertisement messages 32 from one or more non-dominating set member device and/or any dominating set member advertisement messages from one or more other dominating set members 22, the processor circuit 42 of the dominating set member 22 can in operation 64 update its neighbor table (in the data structure 46) to identify its neighboring dominating set members 22 (direct reachability) and neighboring non-dominating set members that provide indirect reachability to identified dominating set members 22. The transmission of multicast advertisement messages 32 in the data network 10 can be managed to prevent congestion based on, for example, a prescribed protocol such as the Trickle algorithm as specified in RFC 6206.

The processor circuit 42 of a dominating set member 22 in operation 66 can generate and send in operation 66, via its device interface circuit 40, a unicast reachability advertisement message 30 to the root/PCE device 14 that specifies reachability by the corresponding dominating set member (e.g., "N13") to one or more other dominating set members (e.g., "N15" and/or "N17"), where the reachability is distinct from the nonstoring DODAG topology 20. For example, the processor circuit 42 of the dominating set member "N5-A" 22 can generate a unicast reachability advertisement message 30 (output by the corresponding device interface circuit 40) specifying that the dominating set member "A" 22 can indirectly reach the dominating set member "B" 22; the unicast reachability advertisement message 30 can be implemented as a unicast nonstoring DAO message according to RFC 6550, as modified herein, to specify a target "B" (as described in section 6.7.7 of RFC 6550) is reachable via a transit "A" (as described in section 6.7.8 of RFC 6550) via an "indirect path". Similarly, the processor circuit 42 of the dominating set member "N13-C" 22 can generate a unicast reachability advertisement message 30 (output by the corresponding device interface circuit 40) specifying that the dominating set member "C" 22 can indirectly reach the dominating set members "D" and "F" 22 (e.g., targets "D" and "F" reachable via transit "C" via an "indirect path").

Similarly, the processor circuit 42 of the dominating set member (e.g., "N14") 22 can respond to the dominating set member advertisement message from the dominating set member (e.g., "N9-B"), by generating in operation 66 a unicast reachability advertisement message 30 (output by the corresponding device interface circuit 40) specifying that the dominating set member "B" is directly reachable via a data link that is distinct from the nonstoring DODAG topology 20 illustrated in FIG. 1A.

As described previously, a dominating set member 22 can receive a plurality of advertisement messages multicast by respective non-dominating set network devices (e.g., dominating set members "A" and "B" receiving respective multicast advertisement messages 32 from non-dominating set members "m1" through "m10"; dominating set members "C", "D", and "F" receiving respective multicast advertisement messages 32 from non-dominating set members "n1", "n2", "n3", etc.), each multicast advertisement message 32 specifying reachability to the one or more other dominating set members. Hence, the processor circuit 42 of a dominating set member (e.g., "A") receiving multiple multicast advertisement messages 32 (e.g., from "m1" through "m10") can store in operation 64 that the one or more dominating set members (e.g., "B") are reachable via the non-dominating set network devices (e.g., "m1" through "m10") (dominating set member "C" can store in operation 64 that the dominating set members "D" and "F" are reachable via "n1", "n2", and "n3"). Hence, the processor circuit 42 of a dominating set member 22 in operation 68 optionally can specify in the unicast reachability advertisement message 30 a first identification of the non-dominating set network devices providing reachability to the one or more dominating set members, such that the dominating set member "A" can specify the first identification of the non-dominating set network devices (e.g., from "m1" through "m10") providing reachability for the dominating set member "A" to reach the dominating set member "B". Similarly, the dominating set member "C" in operation 68 can specify the first identification of the non-dominating set network devices (e.g., "n1", "n2", and "n3") providing reachability for the dominating set member "C" to reach the dominating set members "D" and "F".

Referring to FIG. 3B, the processor circuit 42 of the root/PCE device 14 in operation 70 can respond to the corresponding device interface circuit 40 receiving one or more of the unicast reachability advertisement messages 30 from respective dominating set members 22 by updating its dominating set neighbor table (and/or its network topology tables) stored in the data structure 46. Hence, the processor circuit 42 of the root/PCE device 14 in operation 70 can store the direct and indirect reachability information specified by the unicast reachability advertisement messages 30 describing direct paths between dominating set members (e.g., between "N9" and "N14") 22 and/or indirect paths between dominating set members 22, where the direct paths and the indirect paths are distinct from the nonstoring DODAG topology 20.

Figure 4:
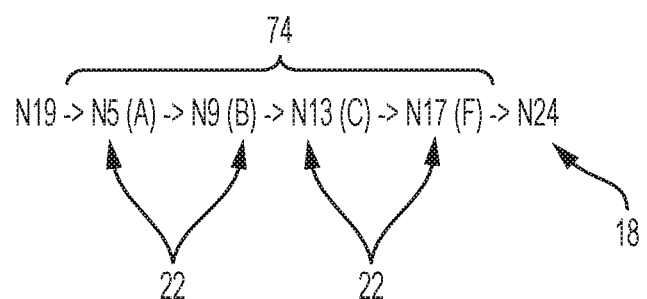
FIG. 4 illustrates an example optimized path providing cut-through optimization across a nonstoring DODAG topology by dominating set members, according to an example embodiment.

The processor circuit 42 of the root/PCE device 14 in operation 72 also can respond to receiving the unicast reachability advertisement messages 30 by generating in operation 72 an optimized path 18 for reaching a destination network device (e.g., "N24") in the nonstoring DODAG topology 20 via a selected sequence (74 of FIG. 4) of dominating set members 22, such that the direct and/or indirect paths between the dominating set members 22 in the selected sequence 74 enables the optimized path 18 to provide a cut-through optimization that "cuts across" the nonstoring DODAG topology 20 via one or more neighbor paths that are distinct from the nonstoring DODAG topology 20. As illustrated in FIG. 1D, the optimized path 18 follows along the single-hop paths "A->"m" and "C->"n" that are distinct from the nonstoring DODAG topology 20 because the single-hop paths away from the root/PCE device 14 are not present in a nonstoring DODAG topology 20.

Hence, the optimized path 18 provides a cut-through optimization based on one or more paths between two dominating set members 22, where a path between two dominating set members can be via a network device that is not via a common parent of the two dominating set members (e.g., a non-dominating set network device "m" or "n"), or a via a direct link between the two dominating set members that is not part of the nonstoring DODAG topology 20. If the processor circuit 42 of the root/PCE device 14 detects multiple non-dominating set members (e.g., "m1" through "m10") are available as relays for one dominating set member (e.g., "A") 22 to reach another dominating set member (e.g., "B") 22, the processor circuit 42 of the root/PCE device 14 in operation 72 can select a group (e.g., "m1" through "m5") of the non-dominating set members (e.g., "m1" through "m10") as available relays for the first dominating set member "A" 22 to reach the second dominating set member "B" 22.

In response to generating in operation 72 the optimized path 18 for the destination network device "N24", the processor circuit 42 of the root/PCE device 14 can send to one or more of the dominating set members 22 in the optimized path 18 (e.g., the ingress end "A" and/or the egress end "F") an instruction message (76 of FIG. 1C) in operation 78 that specifies path information for deployment of the optimized path 18 for reaching the destination network device "N24" along the selected sequence 74 of the dominating set members 22. The instruction message 76 can be implemented as a DAO projection message as described in the Internet Draft by Thubert et al., "Root Initiated Routing State in RPL," modified as described herein.

For example, the processor circuit 42 of the root/PCE device 14 in operation 78 can output an instruction message 76, specifying the selected sequence 74 of dominating set members "A-B-C-F" 22 to the "ingress" dominating set member "A" 22; the instruction message 76 also can specify, if appropriate, the selected group (e.g., "m1" through "m5") of non-dominating set members that can be used as available relays to reach the next dominating set member (e.g., "B") 22, for example to minimize loading on the non-selected non-dominating set members (e.g., "m6" through "m10"). In response to the device interface circuit 40 of the dominating set member "A" 22 receiving the selected sequence 74 for the destination device "N24", the processor circuit 42 of the "ingress" dominating set member "A" 22 in operation 80 can store in its memory circuit 44 a route table entry specifying that the destination network device "N24" is reachable via the loose source route path specified in the selected sequence 74 of dominating set members "A-B-C-F" 22.

Hence, in response to the device interface circuit 40 of the ingress dominating set member "A" 22 receiving in operation 82 a data packet destined for the non-dominating set destination device "N24" and having received an instruction message 76 specifying the loose source route path of dominating set members "A-B-C-F" 22, the processor circuit 42 of the ingress dominating set member "A" 22 in operation 84 can execute routing based on inserting the IPv6 address of the dominating set member "B" in the destination address field of the data packet, and inserting the dominating set member-only loose source routing header (comprising the sequence of dominating set members "C-D-F" and ending with the IPv6 address of the destination device "N24") into the routing header of the received data packet, resulting in the routing header specifying at least the sequence "C-D-F-N24" (if preferred, the entire path "A-B-C-F-N24" that includes the destination can be inserted into the routing header); the processor circuit 42 of the ingress dominating set member "A" 22 also can identify from its neighbor table that the successor dominating set member "B" in the selected sequence 74 is reachable via the non-dominating set member "m" (or any one of the selected group "m1" through "m5", as appropriate) as an available relay.

In response to detecting the non-dominating set member "m" as the available relay, the processor circuit 42 of the ingress dominating set member "A" 22 can add the link layer address of the next-hop non-dominating set member "m" (e.g., Media Access Control (MAC) address or IEEE-based address) as the next-hop link layer destination, and can transmit the data packet (specifying at least a portion of the selected sequence 74 as a loose source route path in the routing header) to the available relay "m". The available relay "m", in response to receiving the data packet, can determine from its neighbor table that it can reach the successor dominating set member "B" specified in the destination address field, and in response can forward the data packet to the next-hop successor dominating set member "B". Since the successor dominating set member "B" 22 in operation 86 is not the last "egress" member 22 in the optimized path 18 as specified in the routing header, the processor circuit 42 of the dominating set member "B" 22 can update the routing header in operation 88 and update the destination IP address of the data packet to specify the successor dominating set member "C", and forward the data packet to the successor dominating set member "C" 22, which can repeat operations 82, 86, and 88 to forward the data packet to the successor dominating set member "F" based on the routing header (via the available relay "n" specified in its neighbor table, or selected available relays "n1" or "n2" from a corresponding instruction message 76 from the root/PCE device 14, as appropriate). As described previously, the dominating set member "C" can add the link layer address of the selected available relay (e.g., "n", "n1", etc.) and forward the data packet to the selected available relay; the selected relay, in response to receiving the data packet, can determine from its neighbor table that the dominating set member "F" 22 (identified in the destination IP address of the IPv6 data packet) is reachable via a direct link, and in response forward the data packet to the dominating set member "F".

In response to the device interface circuit 40 of the egress dominating set member "F" 22 receiving the data packet in operation 82, the processor circuit 42 of the egress dominating set member "F" 22 in operation 86 can determine from the routing header that it that it is the last "egress" dominating set member 22 in the optimized path 18, and in response can update the destination address field with the IPv6 address of the destination device "N24", and forward in operation 90 the data packet to the destination network device "N24".

The example embodiments also enable the root/PCE device 14 to unicast transmit the instruction message 76 to another dominating set member 22 identified in the instruction message 76, for example the egress dominating set member "F" 22 (the processor circuit 42 of the root/PCE device 14 also can optionally specify all available relays, for example "m1" through "m5", "n1" and "n2", etc.), enabling at least portions of the path information for the optimized path 18 to be propagated "upstream" along the optimized path 18 along a segment in the selected sequence 74 of dominating set members. In this example, the processor circuit 42 of the egress dominating set member "F" 22 can respond to reception of the instruction message 76 containing the path information for the optimized path 18 (specifying the selected sequence 74 "A-B-C-F" of the dominating set members 22) by updating its neighbor table (in the data structure 46) in operation 80 with a first portion of the path information to specify itself as the egress dominating set member for the destination device "N24" (e.g., for at least a specified time interval specified in the instruction message 76), and forward the instruction message 76 "upstream" to the predecessor dominating set member "C" (via the available relay "n").

In response to the device interface circuit 40 of the predecessor dominating set member "C" 22 along the optimized path 18 receiving the instruction message 76, the corresponding processor circuit 42 of the predecessor dominating set member "C" 22 can store in operation 80 at least a first portion of the path information in its routing table (e.g., that the destination device "N24" is reachable via the successor dominating set member "F" 22), and forward at least a second portion of the path information (e.g., that the destination device "N24" is reachable via the selected sequence "A-B-C") to its reachable predecessor dominating set member "B" 22 in the selected sequence 74. Similarly, the predecessor dominating set member "B" along the optimized path 18, in response to receiving the second portion from the instruction message 76, can update its routing table to specify the destination device "N24" is reachable via the successor dominating set member "C" 22, and the predecessor dominating set member "B" 22 can forward at least a third portion of the path information (e.g., that the destination device "N24" is reachable via the selected sequence "A-B") to its predecessor dominating set member "A" along the optimized path 18.

Hence, the ingress dominating set member "A" in operation 80 can update its routing table to specify that the destination device "N24" is reachable via the selected sequence "A-B". Consequently, the path information can be propagated "upward" along the segment formed by the selected sequence 74 of the dominating set members.

Consequently, in response to receiving in operation 82 a data packet from the network device "N19" destined for the network device "N24", the processor circuit 42 of the ingress dominating set member "A" in operation 84 can insert a routing header for reaching the destination network device "N24" via its successor dominating set member "B" 22, and can access its neighbor table to identify the link layer address for appropriate relay (e.g., "m", "m1" through "m5", etc.). The successor dominating set member "B" in operation 84 can update the destination address field and/or the routing header of the received data packet based on its stored entry that the destination device "N24" is reachable via the successor dominating set member "C" 22; the successor dominating set member "C" in operation 84 can update the destination address field and/or the routing header of the received data packet based on its stored entry that the destination device "N24" is reachable via the successor dominating set member "F" 22, and can access its neighbor table to identify the link layer address for the appropriate relay (e.g., "n", "n1" or "n2"), and forward the data packet to the successor dominating set member "F" (e.g., via the relay "n"), enabling the egress dominating set member "F" in operation 90 to forward the data packet to the destination device "N24".

According to example embodiments, membership in a dominating set can be substantially reduced, while also optimizing a path to a destination based on using cut-through optimization across the nonstoring DODAG topology based on reachability between selected dominating set members, where the reachability is distinct from the nonstoring DODAG topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

identifying, by a path computation element, essential parent devices from a nonstoring destination oriented directed acyclic graph (DODAG) topology as dominating set members belonging to a dominating set used for path computation by the path computation element, including reducing membership in the dominating set to only a root of the nonstoring DODAG topology and the essential parent devices, the identifying including excluding from the dominating set all leaf devices in the nonstoring DODAG topology and excluding from the dominating set redundant parent devices in the nonstoring DODAG topology;

receiving, by the path computation element, an advertisement message specifying a first dominating set member having reachability to a second dominating set member, the reachability distinct from the nonstoring DODAG topology; and generating, by the path computation element based on the advertisement message, an optimized path for reaching a destination network device in the nonstoring DODAG topology by limiting computation of the optimized path by the path computation element to the dominating set members, the optimized path reaching the destination network device via a selected sequence of essential parent devices, the optimized path distinct from the nonstoring DODAG topology, the optimized path causing a data packet originated by a source network device to reach the destination network device without traversing a common parent network device of the source network device and the destination network device, wherein the common parent network device is in the nonstoring DODAG topology and is not the root;

wherein the identifying essential parent devices includes:

first identifying first essential parent devices that provide an only path for another network device to reach the root, and classifying the first essential parent devices as belonging to the dominating set, and selectively adding one of the redundant parent devices as belonging to the dominating set as a second essential parent device, based on the one redundant parent device providing a necessary path for an identified orphan network device to reach at least one of the first essential parent devices.

2. The method of claim 1, further comprising sending, to each network device in the nonstoring DODAG topology, one of a membership message specifying the corresponding network device is a dominating set member belonging to the dominating set, or a non-membership message specifying the corresponding network device is not a member of the dominating set.

3. The method of claim 1, further comprising:

receiving, by the path computation element, unicast reachability advertisement messages from a respective plurality of the dominating set members, each unicast reachability advertisement message specifying reachability by the corresponding dominating set member to one or more other dominating set members;

the generating of the optimized path based on one or more of the unicast reachability advertisement messages, wherein the optimized path provides optimization based on the corresponding specified reachability being distinct from the nonstoring DODAG topology.

4. The method of claim 3, wherein:

at least one of the unicast reachability advertisement messages from a corresponding first of the dominating set members specifies a plurality of non-dominating set members providing reachability for the first dominating set member to reach a second of the dominating set members;

the method further comprising the path computation element selecting a group of the non-dominating set members as available relays for the first dominating set member to reach the second dominating set member;

the method further comprising the path computation element sending an instruction to the first dominating set member that identifies the group of non-dominating set members as the available relays for the first dominating set member to reach the second dominating set member.

5. The method of claim 1, wherein the generating of the optimized path that is distinct from the nonstoring DODAG topology is based on reachability between one or more of the selected sequence of essential parent devices that is distinct from the nonstoring DODAG topology.

6. The method of claim 1, further comprising sending, by the path computation element, an instruction to at least one of an ingress end or an egress end of the selected sequence of essential parent devices, for deployment of the optimized path among the selected sequence of essential parent devices.

7. An apparatus comprising:

a processor circuit configured for identifying essential parent devices from a nonstoring destination oriented directed acyclic graph (DODAG) topology as dominating set members belonging to a dominating set used for path computation by the apparatus as a path computation element, the identifying by the processor circuit including reducing membership in the dominating set to only a root of the nonstoring DODAG topology and the essential parent devices, the identifying including excluding from the dominating set all leaf devices in the nonstoring DODAG topology and excluding from the dominating set redundant parent devices in the nonstoring DODAG topology; and a device interface circuit configured for receiving an advertisement message specifying a first dominating set member having reachability to a second dominating set member, the reachability distinct from the nonstoring DODAG topology;

the processor circuit further configured for generating, based on the advertisement message, an optimized path for reaching a destination network device in the nonstoring DODAG topology by limiting computation of the optimized path by the path computation element to the dominating set members, the optimized path reaching the destination network device via a selected sequence of essential parent devices, the optimized path distinct from the nonstoring DODAG topology, the optimized path causing a data packet originated by a source network device to reach the destination network device without traversing a common parent network device of the source network device and the destination network device, wherein the common parent network device is in the nonstoring DODAG topology and is not the root;

wherein the processor circuit is configured for identifying essential parent devices based on:

first identifying first essential parent devices that provide an only path for another network device to reach the root, and classifying the first essential parent devices as belonging to the dominating set, and selectively adding one of the redundant parent devices as belonging to the dominating set as a second essential parent device, based on the one redundant parent device providing a necessary path for an identified orphan network device to reach at least one of the first essential parent devices.

8. The apparatus of claim 7, wherein:

the device interface circuit is configured for receiving unicast reachability advertisement messages from a respective plurality of the dominating set members, each unicast reachability advertisement message specifying reachability by the corresponding dominating set member to one or more other dominating set members;

the processor circuit configured for generating the optimized path based on one or more of the unicast reachability advertisement messages, wherein the optimized path provides optimization based on the corresponding specified reachability being distinct from the nonstoring DODAG topology.

9. One or more non-transitory tangible media encoded with logic for execution by a machine and when executed by the machine operable for:

identifying, by the machine implemented as a path computation element, essential parent devices from a nonstoring destination oriented directed acyclic graph (DODAG) topology as dominating set members belonging to a dominating set used for path computation by the path computation element, including reducing membership in the dominating set to only a root of the nonstoring DODAG topology and the essential parent devices, the identifying including excluding from the dominating set all leaf devices in the nonstoring DODAG topology and excluding from the dominating set redundant parent devices in the nonstoring DODAG topology;

receiving, by the path computation element, an advertisement message specifying a first dominating set member having reachability to a second dominating set member, the reachability distinct from the nonstoring DODAG topology; and generating, by the path computation element based on the advertisement message, an optimized path for reaching a destination network device in the nonstoring DODAG topology by limiting computation of the optimized path by the path computation element to the dominating set members, the optimized path reaching the destination network device via a selected sequence of essential parent devices, the optimized path distinct from the nonstoring DODAG topology, the optimized path causing a data packet originated by a source network device to reach the destination network device without traversing a common parent network device of the source network device and the destination network device, wherein the common parent network device is in the nonstoring DODAG topology and is not the root;

wherein the identifying essential parent devices includes:

first identifying first essential parent devices that provide an only path for another network device to reach the root, and classifying the first essential parent devices as belonging to the dominating set, and selectively adding one of the redundant parent devices as belonging to the dominating set as a second essential parent device, based on the one redundant parent device providing a necessary path for an identified orphan network device to reach at least one of the first essential parent devices.

10. A method comprising:

receiving, by a network device in a nonstoring destination oriented directed acyclic graph (DODAG) topology, a membership message from a root of the nonstoring DODAG topology, the membership message identifying the network device as a dominating set member belonging to a dominating set of dominating set members limited to only the root and essential parent devices in the nonstoring DODAG topology, wherein all leaf devices in the nonstoring DODAG topology and redundant parent devices in the nonstoring DODAG topology are excluded from the dominating set;

advertising, by the network device to the root, reachability by the network device to one or more other dominating set members;

receiving, by the network device, path information for reaching a destination network device in the nonstoring DODAG topology, the path information generated by a path computation element by limiting computation of an optimized path to the dominating set members, the optimized path reaching the destination network device via a selected sequence of essential parent devices, the path information causing the network device to forward a data packet, originated by a source network device, toward the destination network device along the optimized path that is distinct from the nonstoring DODAG topology, the optimized path causing the data packet to reach the destination network device without traversing a common parent network device of the source network device and the destination network device, wherein the common parent network device is in the nonstoring DODAG topology and is not the root;

detecting, by the network device, an advertisement message multicast by a non-dominating set network device in the nonstoring DODAG topology, the advertisement message specifying that the non-dominating set network device can reach the one or more other dominating set members distinct from the network device; and storing in a memory circuit, by the network device, that the one or more dominating set members are reachable via the non-dominating set network device;

wherein the advertising to the root of the reachability by the network device to the one or more other dominating set members is based on the advertisement message detected by the network device.

11. The method of claim 10, wherein:

the path information includes an identification of the sequence of essential parent devices, causing the network device to forward the data packet based on one of:

inserting, by the network device, at least a portion of the sequence of essential parent devices into a routing header of the data packet for forwarding along the optimized path; or storing, by the network device, at least a first portion of the path information in the memory circuit in the network device, and forwarding at least a second portion of the path information to a first reachable one of the dominating set members in the sequence of essential parent devices.

12. The method of claim 11, wherein the path information is received, by the network device, from a second reachable one of the dominating set members in the sequence of essential parent devices, wherein the second reachable one dominating set member, the network device, and the first reachable one dominating set member form a segment in the sequence of essential parent devices.

13. The method of claim 10, wherein:
the detecting comprising receiving a plurality of advertisement messages multicast by respective non-dominating set network devices, each specifying reachability to the one or more other dominating set members;
the storing further includes storing that the one or more dominating set members are reachable via the non-dominating set network devices;
the advertising to the root of the reachability further includes a first identification of the non-dominating set network devices providing reachability to the one or more dominating set members;
the method further comprising receiving, from the root, a second identification of a selected group of the non-dominating set network devices to be used by the network device for reaching the one or more dominating set members;
wherein the second identification enables the network device to forward the data packet, along the optimized path, via any one of the selected group of the non-dominating set network devices.

14. An apparatus comprising:
a device interface circuit configured for receiving, in a nonstoring destination oriented directed acyclic graph (DODAG) topology, a membership message from a root of the nonstoring DODAG topology, the membership message identifying the apparatus as a dominating set member belonging to a dominating set of dominating set members limited to only the root and essential parent devices in the nonstoring DODAG topology, wherein all leaf devices in the nonstoring DODAG topology and redundant parent devices in the nonstoring DODAG topology are excluded from the dominating set;
a memory circuit; and
a processor circuit configured for generating an advertisement for transmission by the device interface circuit to the root, the advertisement advertising reachability by apparatus to one or more other dominating set members;
the device interface circuit further configured for receiving path information for reaching a destination network device in the nonstoring DODAG topology, the path information generated by a path computation element by limiting computation of an optimized path to the dominating set members, the optimized path reaching the destination network device via a selected sequence of essential parent devices, the path information causing the processor circuit to cause forwarding of a data packet, originated by a source network device, toward the destination network device along the optimized path that is distinct from the nonstoring DODAG topology, the optimized path causing the data packet to reach the destination network device without traversing a common parent network device of the source network device and the destination network device, wherein the common parent network device is in the nonstoring DODAG topology and is not the root;

wherein:
the device interface circuit is configured for detecting an advertisement message multicast by a non-dominating set network device in the nonstoring DODAG topology, the advertisement message specifying that the non-dominating set network device can reach the one or more other dominating set members distinct from the network device,
the processor circuit configured for storing in the memory circuit that the one or more dominating set members are reachable via the non-dominating set network device,
wherein the advertising to the root of the reachability by the network device to the one or more other dominating set members is based on the advertisement message detected by the network device.

15. The apparatus of claim 14, wherein:
the path information includes an identification of the sequence of essential parent devices, causing the processor circuit to cause forwarding of the data packet based on one of:
inserting, by the processor circuit, at least a portion of the sequence of essential parent devices into a routing header of the data packet for forwarding along the optimized path; or
storing, by the processor circuit, at least a first portion of the path information into the memory circuit, and causing forwarding of at least a second portion of the path information to a first reachable one of the dominating set members in the sequence of essential parent devices.

16. One or more non-transitory tangible media encoded with logic for execution by a machine and when executed by the machine operable for:
receiving, by the machine implemented as a network device in a nonstoring destination oriented directed acyclic graph (DODAG) topology, a membership message from a root of the nonstoring DODAG topology, the membership message identifying the network device as a dominating set member belonging to a dominating set of dominating set members limited to only the root and essential parent devices in the nonstoring DODAG topology, wherein all leaf devices in the nonstoring DODAG topology and redundant parent devices in the nonstoring DODAG topology are excluded from the dominating set;
advertising, by the network device to the root, reachability by the network device to one or more other dominating set members; and
receiving, by the network device, path information for reaching a destination network device in the nonstoring DODAG topology, the path information generated by a path computation element by limiting computation of an optimized path to the dominating set members, the optimized path reaching the destination network device via a selected sequence of essential parent devices, the path information causing the network device to forward a data packet, originated by a source network device, toward the destination network device along the optimized path that is distinct from the nonstoring DODAG topology, the optimized path causing the data packet to reach the destination network device without traversing a common parent network device of the source network device and the destination network device, wherein the common parent network device is in the nonstoring DODAG topology and is not the root;

detecting, by the network device, an advertisement message multicast by a non-dominating set network device in the nonstoring DODAG topology, the advertisement message specifying that the non-dominating set network device can reach the one or more other dominating set members distinct from the network device; and storing in a memory circuit, by the network device, that the one or more dominating set members are reachable via the non-dominating set network device;

wherein the advertising to the root of the reachability by the network device to the one or more other dominating set members is based on the advertisement message detected by the network device.

17. The one or more non-transitory tangible media of claim 9, further operable for:

sending, to each network device in the nonstoring DODAG topology, one of a membership message specifying the corresponding network device is a dominating set member belonging to the dominating set, or a non-membership message specifying the corresponding network device is not a member of the dominating set.

18. The one or more non-transitory tangible media of claim 9, further operable for:

receiving, by the path computation element, unicast reachability advertisement messages from a respective plurality of the dominating set members, each unicast reachability advertisement message specifying reachability by the corresponding dominating set member to one or more other dominating set members;

the generating of the optimized path based on one or more of the unicast reachability advertisement messages, wherein the optimized path provides optimization based on the corresponding specified reachability being distinct from the nonstoring DODAG topology.

19. The apparatus of claim 14, wherein:

the path information includes an identification of the sequence of essential parent devices, the processor circuit configured for forwarding the data packet based on one of:

inserting at least a portion of the sequence of essential parent devices into a routing header of the data packet for forwarding along the optimized path; or storing at least a first portion of the path information in the memory circuit, and forwarding at least a second portion of the path information to a first reachable one of the dominating set members in the sequence of essential parent devices.

20. The one or more non-transitory tangible media of claim 16, wherein:

the path information includes an identification of the sequence of essential parent devices, causing the network device to forward the data packet based on one of:

inserting at least a portion of the sequence of essential parent devices into a routing header of the data packet for forwarding along the optimized path; or storing at least a first portion of the path information in the memory circuit in the network device, and forwarding at least a second portion of the path information to a first reachable one of the dominating set members in the sequence of essential parent devices.

* * * * *